US007957410B2

(12) United States Patent
Mosko et al.

(10) Patent No.: US 7,957,410 B2
(45) Date of Patent: Jun. 7, 2011

(54) PROPORTIONALLY FAIR-SHARE TIME SLOT RESERVATIONS WITH A FAST INCREASE, SLOW DECREASE RATE CONTROLLER

(75) Inventors: Marc E. Mosko, Santa Cruz, CA (US); Ignacio Solis, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 154 days.

(21) Appl. No.: 12/331,823

(22) Filed: Dec. 10, 2008

(65) Prior Publication Data

US 2010/0142551 A1 Jun. 10, 2010

(51) Int. Cl.
*H04L 12/43* (2006.01)
(52) U.S. Cl. ....................................................... 370/461
(58) Field of Classification Search ........................ None
See application file for complete search history.

(56) References Cited

U.S. PATENT DOCUMENTS

| | | | | |
|---|---|---|---|---|
| 2002/0159411 | A1* | 10/2002 | Airy et al. | 370/330 |
| 2003/0210712 | A1* | 11/2003 | Cai et al. | 370/498 |
| 2004/0032847 | A1* | 2/2004 | Cain | 370/338 |
| 2007/0097900 | A1* | 5/2007 | Kim et al. | 370/318 |
| 2007/0149186 | A1* | 6/2007 | Barbosa da Torre et al. | 455/423 |
| 2007/0195748 | A1* | 8/2007 | Radulescu | 370/351 |
| 2009/0125909 | A1* | 5/2009 | Li et al. | 718/103 |

* cited by examiner

*Primary Examiner* — Seema Rao
*Assistant Examiner* — Jianye Wu
(74) *Attorney, Agent, or Firm* — Park, Vaughan, Fleming & Dowler LLP; Shun Yao (57) ABSTRACT

One embodiment of the present invention provides a system for facilitating proportionally fair-share time slot reservations with a fast increase, slow decrease rate controller in an ad hoc dynamic wireless broadcast network. During operation, the system determines local time slot demand, based on transmitted and queued data corresponding to one or more previous decision points. Next, the system broadcasts the local time slot demand to one or more neighbors. The system also determines neighbor time slot demands, where a respective neighbor time slot demand indicates a particular neighbor's local time slot demand corresponding to one or more previous decision points. Next, the system determines neighborhood time slot demand, based on the local time slot demand and the neighbor time slot demands. Next, the system determines allowable reserved time slots based on the local time slot demand and allowable reserved time slots corresponding to one or more previous decision points.

24 Claims, 6 Drawing Sheets

PROPORTIONALLY FAIR-SHARE TIME SLOT RESERVATIONS WITH A FAST INCREASE, SLOW DECREASE RATE CONTROLLER

FIELD

The present disclosure relates generally to a time slot reservation method for data transmissions in a computer network. More specifically, the present disclosure relates to a method for facilitating proportionally fair-share time slot reservations with a fast increase, slow decrease rate controller in an ad hoc dynamic wireless broadcast network.

RELATED ART

Previous work on reservations in ad hoc dynamic wireless broadcast networks using TDMA (Time Division Multiple Access) systems exists mostly in the cellular GSM (Global System for Mobile communication) and PCS (Personal Communication Services) environment. The Dynamic Time Division Multiple Access (D-TDMA) protocol, originally used in satellite communications, and extended to wireless PCS, allocates a fixed portion of the system bandwidth to making reservations via short reservation packets. The TDMA frame contains reservation time slots, voice time slots, and data time slots. A node with a new talkspurt picks one reservation time slot at random in the next frame and transmits a reservation request in, for example, a CSMA/CD (Carrier Sense Multiple Access with Collision Detection) manner. At the end of the reservation request period, the base station broadcasts back the successful reservation requests, including which voice time slot to use for the duration of the talkspurt. Unsuccessful reservation attempts may be retried in subsequent frames, if failure is due to collision, or may be queued by the base station, if failure is due to a lack of voice time slots.

The Packet Reservation Multiple Access (PRMA) protocol exploits talkspurts to reserve time slots. The TDMA frame is divided into time slots which may be in the Reserved state or the Available state. Data and voice users may contend for a time slot with different probabilities. If a voice user reserves a time slot, it is marked as Reserved until released for the talkspurt. If a data user wins the time slot, the time slot remains in the Available state and the data user may not re-use the time slot at a later time without contenting for that time slot. No fixed allocation of bandwidth to reservations is made, but time slots may be wasted due to collisions.

The Resource Auction Multiple Access (RAMA) protocol uses a similar frame structure to D-TDMA: there are auction time slots (like reservation time slots), voice time slots, and data time slots. Instead of using a time-slotted CSMA/CD access, as in D-TDMA, RAMA uses an auction strategy. Each use generates a random ID, prepended with a priority (i.e., voice versus data). The length of the IDs may vary, but must be large enough that the probability of two users generating the same ID is very small. At the beginning of an auction, each station transmits its ID one digit at a time. After each round of the auction, the base station announces the highest bid so far. Collisions do not cause loss or erasure, and tied nodes continue to transmit digits until there is one final winner at the end of the auction.

Garcia-Luna-Aceves and Bao disclose a TWMA (Time Wave Multiple Access; U.S. Pat. No. 7,046,639) protocol and also claim a bandwidth allocation mechanism. Bandwidth allocation is done by virtual node IDs in the time slot election process and is not governed by fair-share limits or rate controllers. Without fair-share limits, some nodes in the network can dominate transmission time slots.

Garcia-Luna-Aceves, Beyer, and Fullmer, in connection with the NETS (Neighborhood Established Transmission Scheduling; U.S. Pat. No. 6,788,702) protocol, and Garcia-Luna-Aceves and Fullmer, in connection with the CONETS (Collocated Neighborhood Established Transmission Scheduling; U.S. Pat. No. 6,928,061) protocol, also claim a reservation mechanism. Each node generates an active scheduled link (ASL), which reserves a contiguous set of time slots for a node. Neighbors exchange ASL messages until they agree on a common schedule.

Each ASL has a lifetime called frames to live (FTL). CONETS uses acknowledgement packets for ASL packets to indicate that a given neighbor agrees with a proposed schedule. The nature of CONETS is that nodes contend for time slot ranges via ASL messages, which may be accepted or rejected by neighbors. An MDRP (Mobile Data Request Protocol) is significantly different. Nodes in MDRP may only reserve time slots that are won via a distributed election. In the event that two nodes try to reserve the same time slot (i.e., over two frames), a distributed contention resolution occurs using a hash function. There are no proposed schedules and no scheduling delay because neighbors must validate ASLs.

SUMMARY

One embodiment of the present invention provides a system for facilitating proportionally fair-share time slot reservations with a fast increase, slow decrease rate controller in an ad hoc dynamic wireless broadcast network. During operation, the system determines local time slot demand based on transmitted and queued data corresponding to one or more previous decision points. Next, the system broadcasts the local time slot demand to one or more neighbors. The system also determines neighbor time slot demands, where a respective neighbor time slot demand indicates a particular neighbor's local time slot demand corresponding to one or more previous decision points. Next, the system determines neighborhood time slot demand, based on the local time slot demand and the neighbor time slot demands. After this step, the system determines a proportional fair-share time slot assignment based on the local time slot demand. Next, the system determines allowable reserved time slots based on the local time slot demand and allowable reserved time slots corresponding to one or more previous decision points. The system then produces a result which indicates the allowable reserved time slots.

In one variation on this embodiment, determining local time slot demand includes determining a weighted byte demand based on transmitted and queued data. Determining local time slot demand also includes determining an exponentially weighted moving average byte demand based on the weighted byte demand and exponentially weighted moving average byte demands corresponding to one or more previous decision points. Determining local time slot demand also includes determining an exponentially weighted moving average, broadcast bandwidth, and a maximum reservable time slots per frame.

In one variation on this embodiment, determining the weighted byte demand includes determining a weighted sum of one or more traffic priorities of the transmitted and queued data.

In one variation on this embodiment, broadcasting the local time slot demand to one or more neighbors includes encoding the local time slot demand into a load representing a fixed number of bits.

In one variation on this embodiment, determining neighbor time slot demand includes determining that each respective neighbor is within a specific distance from the node, wherein the specific distance can be increased based on a timer.

In one variation on this embodiment, determining neighborhood time slot demand includes determining a weighted sum of the local time slot demand and the neighbor time slot demands.

In one variation on this embodiment, determining the proportionally fair-share time slot assignment includes determining a ratio between the local time slot demand and the neighborhood time slot demand, and determining a maximum reservable time slots per frame.

In one variation on this embodiment, determining allowable reserved time slots includes determining a differential between the proportionally fair-share time slot assignment and a weighted sum of the allowable reserved time slots corresponding to one or more previous decision points; determining a change factor based on the differential; determining an allowable change based on the differential and the change factor; and determining allowable reserved time slots based on a weighted sum of the allowable change and the allowable reserved time slots corresponding to one or more previous decision points.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention facilitate a fair allocation of reservation time slots and the use of a rate controller to control the speed with which a node may increase or decrease its reservations. The context of this embodiment of the present invention is ad hoc dynamic wireless networks, such as multi-hop time division multiple access (TDMA) networks or dynamic TDMA networks. Various other networks could also be used as the context including networks that are fixed, or wired.

Figure 1:
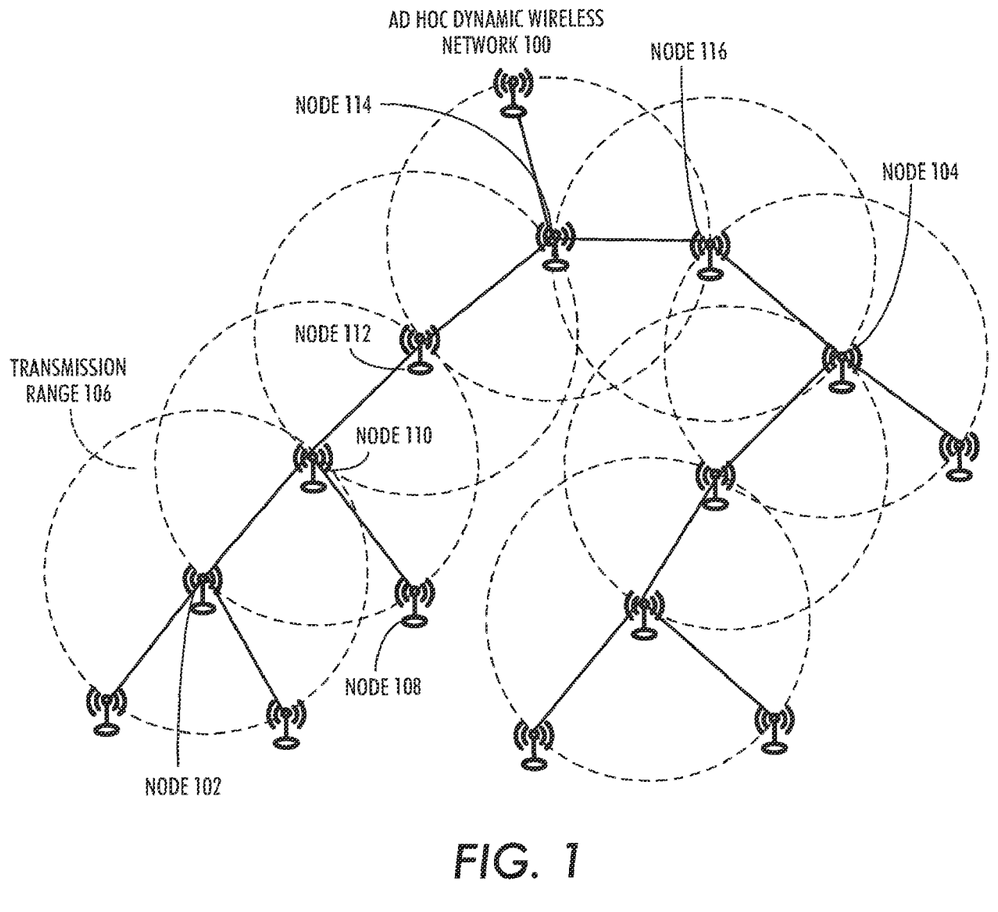
FIG. 1 illustrates an exemplary ad hoc wireless network in accordance with an embodiment of the present invention.

FIG. 1 illustrates a dynamic ad hoc wireless network 100 in accordance with embodiments of the present invention. As illustrated in FIG. 1, wireless network 100 includes nodes 102, 104, 108, 110, 112, and 116. During typical operation, nodes send packets, in pre-defined time slots, to each other and these packets are routed through intermediate nodes. A packet is a block of data that can vary in length. However, embodiments of the present invention are independent of data length. For example, a packet can also be of fixed length.

Nodes in wireless network 100 can send one or more packets to each other. For example, node 108 can send one or more packets to node 104. These packets might be routed through nodes 110, 112, 114, and 116. In general, routing is partially determined by the transmission range. For example, transmission range 106 represents the maximum reliable transmission distance for node 102. Only those nodes within transmission range 106 (e.g., node 110) can receive transmissions from node 102. A node within the transmission range of another node is called a neighbor. Each node in dynamic wireless network 100 is typically equipped with an omni-directional transceiver. Because the transmitter is omni-directional, other neighbor nodes can "overhear" the transmission of a packet from one node to another. Such "overhearing" enables implicit acknowledgment.

A time slot in wireless network 100 corresponds to a specified time interval during which a node can transmit packets. Multiple packets can be sent in the same time slot. Multiple nodes can compete for the same time slot. Various methods can be used for designating a time slot at the sending node. For example, the sender can assume a time slot is designated for that node's transmission after the sender has successfully reserved that time slot. Or, the receiver can communicate to the node that a particular time slot is available for that node's exclusive use (possibly in response to a request for a time slot from the node to the receiver). A packet typically includes data (payload) and header information (e.g., source, destination, and other transit information).

In an ad hoc dynamic wireless network, a node is allocated time slots based on random elections from frame to frame. In embodiments of the present invention, a node may reserve a time slot once it has won the time slot via the random election.

As part of the MAC (Medium Access Control) protocol, nodes can exchange neighborhood information over the interference contention area, which comprises the area in which a node can receive information from multiple neighbors. Embodiments of the present invention extend the neighbor information with one byte of load information. The load information is an encoding of the number of reservation time slots the node would like to have. For example, the load could be 255/max time slots×desired time slots, or could be a non-linear encoding. Given the total time slot demand in a contention area, a node can determine if the contention area is congested or uncongested. A congested contention area is one where the total demand exceeds the maximum possible number of reservation time slots. If the contention area is uncongested, each node can reserve up to its desired number of time slots, with no limit on the reservation rate, provided that the node wins a given time slot in the time slot election and the time slot is not already reserved. If the contention area is congested, each node can be allocated a number of reservations proportional to its load-dependent fair-share of reservation time slots. The rate at which a node can make new reservations or release reservations can be controlled by a proportional rate controller.

Overall System Operation

Figure 2:
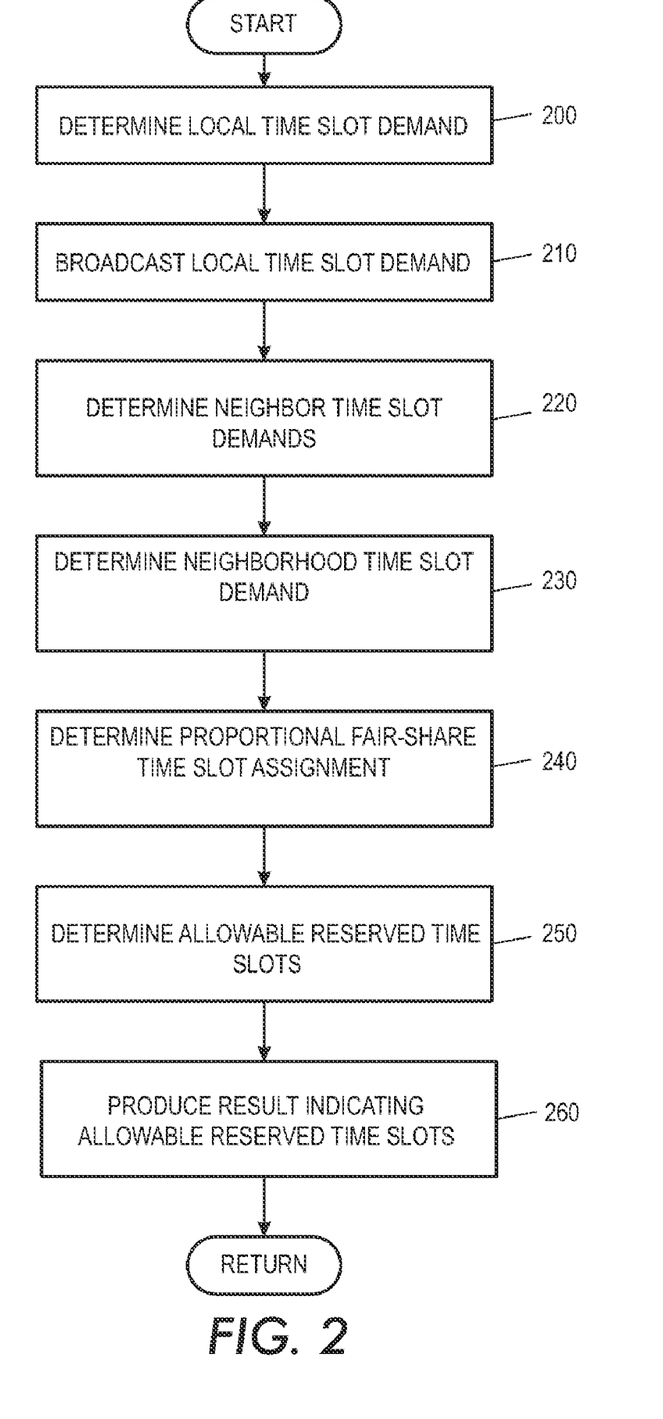
FIG. 2 presents a flowchart illustrating the process of facilitating proportionally fair-share time slot reservations with a fast increase, slow decrease rate controller in accordance with an embodiment of the present invention.

FIG. 2 illustrates a flowchart for facilitating proportionally fair-share time slot reservations with a fast increase, slow decrease rate controller in accordance with an embodiment of the present invention. During operation, the system determines local time slot demand, based on transmitted and queued data corresponding to one or more previous decision points (operation 200). Next, the system broadcasts the local time slot demand to one or more neighbors (operation 210). The system also determines neighbor time slot demands, where a respective neighbor time slot demand indicates a particular neighbor's local time slot demand corresponding to one or more previous decision points (operation 220). Next, the system determines neighborhood time slot demand, based on the local time slot demand and the neighbor time slot demands (operation 230). After this step, the system determines a proportionally fair-share time slot assignment based on the local time slot demand (operation 240). Next, the system determines allowable reserved time slots based on the local time slot demand and allowable reserved time slots corresponding to one or more previous decision points (operation 250). The system then produces a result which indicates the allowable reserved time slots (operation 260).

A decision point is a point in time at which the system produces a result indicating allowable time slots. A local time slot demand, neighbor time slot demands, neighborhood time slot demand, proportionally fair-share time slot assignment, and allowable reserved time slots can all be associated with the same decision point. Decision points can be discrete or continuous and uniform or non-uniform. In an embodiment of the present invention, decision-points can arise every 200 ms.

At each decision point, the system, in accordance with an embodiment of the present invention, can calculate its time slot demand based on an exponentially weighted moving average (EWMA) of transmitted and queued bytes. This time slot demand is disseminated over the TDMA contention area. Using the neighborhood time slot demand, each node determines its proportionally fair-share of the reservable time slots. Next, each node determines a reservation delta for the current period based on a fast-increase, slow-decrease principle to be responsive to new voice talkspurts or data transfer requests. The reservation delta corresponds to the difference between the reservations at one time slot and the next time slot. The reservation delta increase/decrease is dampened by one of several factors, depending on whether the contention area is congested or whether a node's EWMA byte demand is growing.

The system does not explicitly try to maintain a number of reservations based on the existing voice flows. Instead, the system tries to distribute reservations over a contention area in a proportionally fair manner.

MAC Layer

The MAC layer can be a dynamic TDMA MAC where time slots are allocated via a randomized election process. Each node can track some subset of other nodes that are in the contention area. The contention area contains all nodes that can probably cause RF interference at a receiver in the area if more than two nodes in the area transmitted at the same time. This area is often taken as a 2-hop or 3-hop area, although it is possible to determine the area through actual RSSI (Received Signal Strength Indication) measurements.

The interval associated with a time slot can be fixed and relatively large compared to the size of a voice packet. The MAC layer can aggregate multiple packets into a single time slot, even if those packets are for different destinations. The MAC layer may or may not support multiple rates or modulations per time slot. In one embodiment, the MAC layer is a general purpose multiple-hop network, such as a dynamic ad hoc wireless network or a multi-hop mesh network.

Determining Local Time slot Demand

Figure 3:
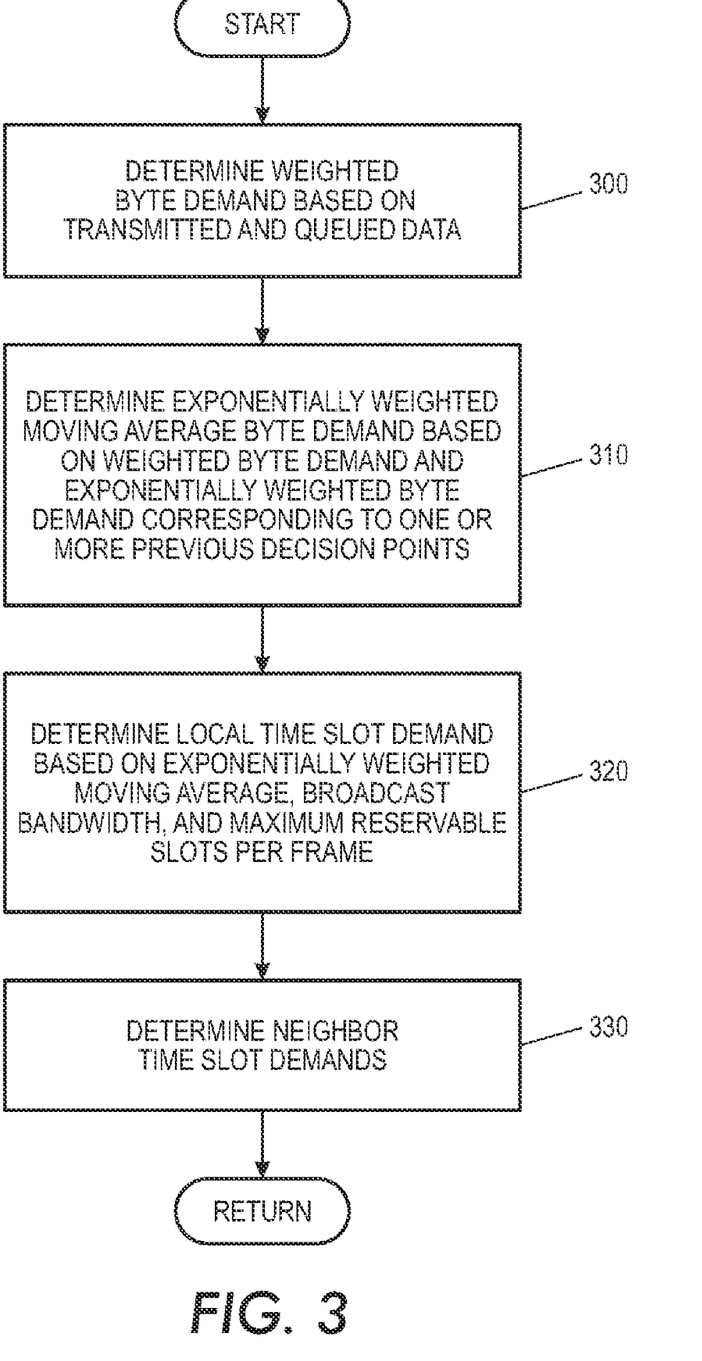
FIG. 3 presents a flowchart illustrating the process of determining local time slot demand in accordance with an embodiment of the present invention.

FIG. 3 illustrates a flowchart for determining local time slot demand in accordance with an embodiment of the present invention. While determining local time slot demand, the system first determines a weighted byte demand based on transmitted and queued data. In one embodiment of the present invention, the system uses a priority-weighted byte demand. Other embodiments of the present invention can explicitly determine local time slot demand based on the arrival times of packets and the desired switching latency.

Embodiments of the present invention include two traffic priorities HI and LO, where voice packets are HI priority and all other traffic is LO priority. However, other embodiments of the present invention can include one or more traffic priorities based on various distinctions in packets.

Each node i can track $b_i(p,t)$, which denotes the number of bytes of priority p transmitted at node i at decision point t. Each node i can also track $q_i(p,t)$, which denotes the bytes of priority p in the queue at node i at decision point t (nodes can have queues that store data to be transmitted).

The weighted byte demand at a present decision point (denoted by t+1) is defined as follows: $wb_i(t+1)=k_{hi}(b_i(HI, t)+q_i(HI, t))+b_i(LO, t)+q_i(LO, t)$. Here $k_{hi}$ denotes the highest priority traffic factor, which can be 3 as a default. Since decision point t+1 corresponds to the present decision point, decision point t corresponds to the preceding decision point. Operation 300 summarizes a process to determine the weighted byte demand based on the transmitted and queued data.

Once the system has determined the weighted byte demand, the system can determine the exponentially weighted moving average byte demand $ewma_i$ at the present decision point (again denoted by t+1) as follows: $ewma_i(t+1)=\alpha \times wb_i(t+1)+(1-\alpha)\times ewma_i(t)$. Here, $\alpha$ is an EWMA (exponentially weighted moving average byte demand) memory factor, $wb_i(t+1)$ is the weighted byte demand for the present decision point, as determined by operation 300, and $ewma_i(t)$ is the exponentially weighted moving average byte demand at the decision point immediately preceding the present decision point. Operation 310 summarizes the process of determining the EWMA for the present decision point. Note that the EWMA at the present decision point can be based on the exponential weighted moving average byte demand at one or more previous decision points with a weighting for respective previous decision points.

After determining the EWMA, the system can determine the local time slot demand $d_i$ at the present decision point (denoted by t+1) as follows: $d_i(t+1)=\max\{ewma_i(t+1)/B_{slot}, R_{max}\}$. Here, $B_{slot}$ is the broadcast bandwidth and $R_{max}$ is the maximum reservable time slots per frame. The default value for $R_{max}$ is 90% of time slots per frame. Note that a frame is a grouping of time slots. In a TDMA network the size of the time slot is fixed (to a specific interval) and the number of time slots per frame is fixed. Determining the local time slot demand is summarized in operation 320. Note that a backlogged node is not allowed to demand more than the maximum reservable time slots. This prevents a node with an unbounded and growing backlog from capturing all reservable time slots. Next, the system can determine neighbor time slot demands (operation 330). This will be described in more detail shortly.

Broadcasting Local Time slot Demand

Broadcasting the local time slot demand to one or more neighbors includes encoding the local time slot demand into a load representing a fixed number of bits. For example, the system can encode the local time slot demand into an 8-bit load with a linear conversion as follows:

$$load_i(t+1) = \left\lceil \frac{255}{R_{max}} d_i(t+1) \right\rceil$$

In this example, $load_i(t+1)$ is the load at node i for the present decision point. The ceiling of $255/R_{max}$ multiplied by the local time slot demand $d_i$ corresponds to an 8-bit encoding of the local time slot demand. As before, $R_{max}$ is the maximum reservable time slots per frame. Other conversions are possible.

Neighbor updates can be ordered at least by their hop count from the originating node, which makes it likely that newer updates supersede earlier updates. Note that a strong ordering (sequence number) is not necessary because correct (collision-free) operation is not dependent on exact agreement on neighborhood load information.

Neighbor updates can be sent at least as often as decision point intervals. At the previous decision point t, node i records the decoded time slot load for node j as $L_{i,j}(t)$, where node j is within node i's N-hop contention area. Thus, determining $L_{i,j}(t)$ is the same as determining neighbor time slot demands, one for each neighbor j. Determining neighbor time slot demands is summarized in operation 220. Note that the neighbor time slot demands can be based on one or more previous decision points.

The most recently received neighbor update can be assumed to correspond to the correct load, where the neighbor updates are ordered only on their hop count from the origin. A neighbor update is considered acceptable if the advertised distance is strictly less than the node's current distance to the advertised node. A soft state timer can be used to increase a node's distance by one (1) hop, so with each timer expiry, the acceptable update distance increases. In short, embodiments of the present invention determine that each respective neighbor of a node is within a specific distance from the node and the specific distance can be increased based on the soft state timer.

Determining Neighborhood Time slot Demand

At each decision point t+1, each node i determines neighborhood time slot demand as follows:

$$D_i(t+1) = d_i(t+1) + \sum_{j \in L_{i,\cdot}(t)} L_{i,j}(t)$$

Here, $L_{i,\cdot}(t)$ denotes the set of neighbors of node i. Note that the neighborhood demand can be based on neighbor demands corresponding to one or more previous decision points, not just the immediately previous one. For example, neighbor demands corresponding to one or more previous decision points can be combined through a weighted average. This operation is summarized in operation 230.

Notice that a node uses its current t+1 local time slot demand, which means that node i is most responsive to its own demand, while using the lag time t load from neighbors. The system can also use a more consistent neighborhood load, by using $d_i(t)$ instead of $d_i(t+1)$ in the above equation.

Node i considers the decision point t+1 uncongested if $D_i(t+1) \leq R_{max}$. In this case, the growth rate is not dampened if we are adding time slots, but is dampened if we are removing time slots. This makes the addition of reservations for new talkspurts quick and responsive, but does not remove them immediately to allow for some fluctuation in time slot demand without penalizing latency-switching. Reservation time slot removal can follow the EWMA time constant for the byte demand and the dampening of the decay delta ($k_s$). The allowable change in reserved time slots is as follows:

$$\Delta_i(t+1) = \begin{cases} \delta & \text{if } \delta \geq 0; \\ \delta k_s & \text{otherwise} \end{cases}$$

Figure 5:
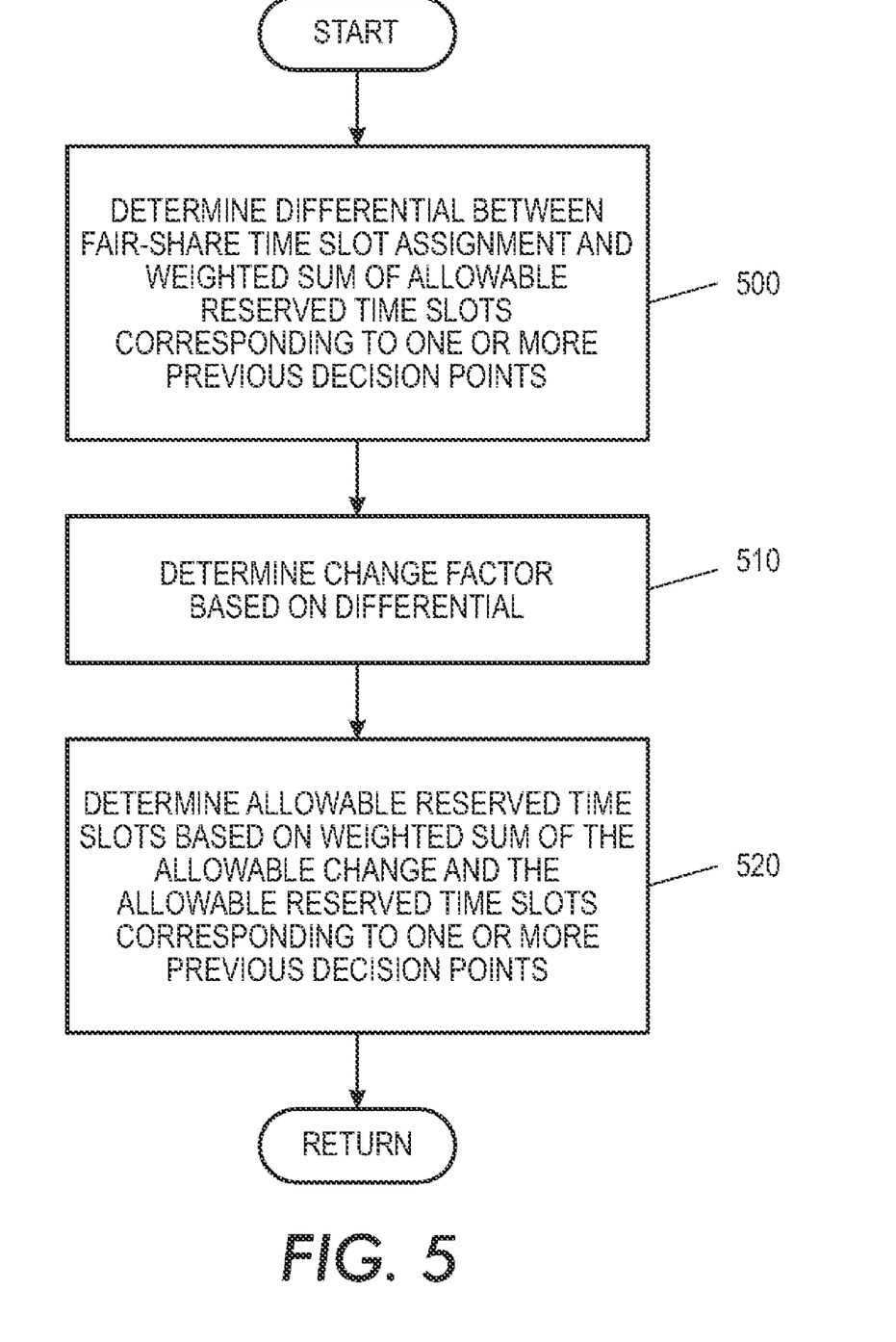
FIG. 5 presents a flowchart illustrating the process of determining allowable reserved time slots in accordance with an embodiment of the present invention.

Here $\delta = d_i(t+1) - \alpha_i(t)$ and $\alpha_i(t)$ is the allowable time slots for node i at decision point t. The symbol $\delta$ is the differential which is determined in operation 500 of FIG. 5. Note that a weighted sum of allowable reserved time slots for node i corresponding to one or more previous decision $$f_i(t+1) = \left\lceil \frac{\frac{d_i(t+1)}{D_i(t+1)}}{R_{max}} \right\rceil$$

points can be used to determine the differential.

Figure 4:
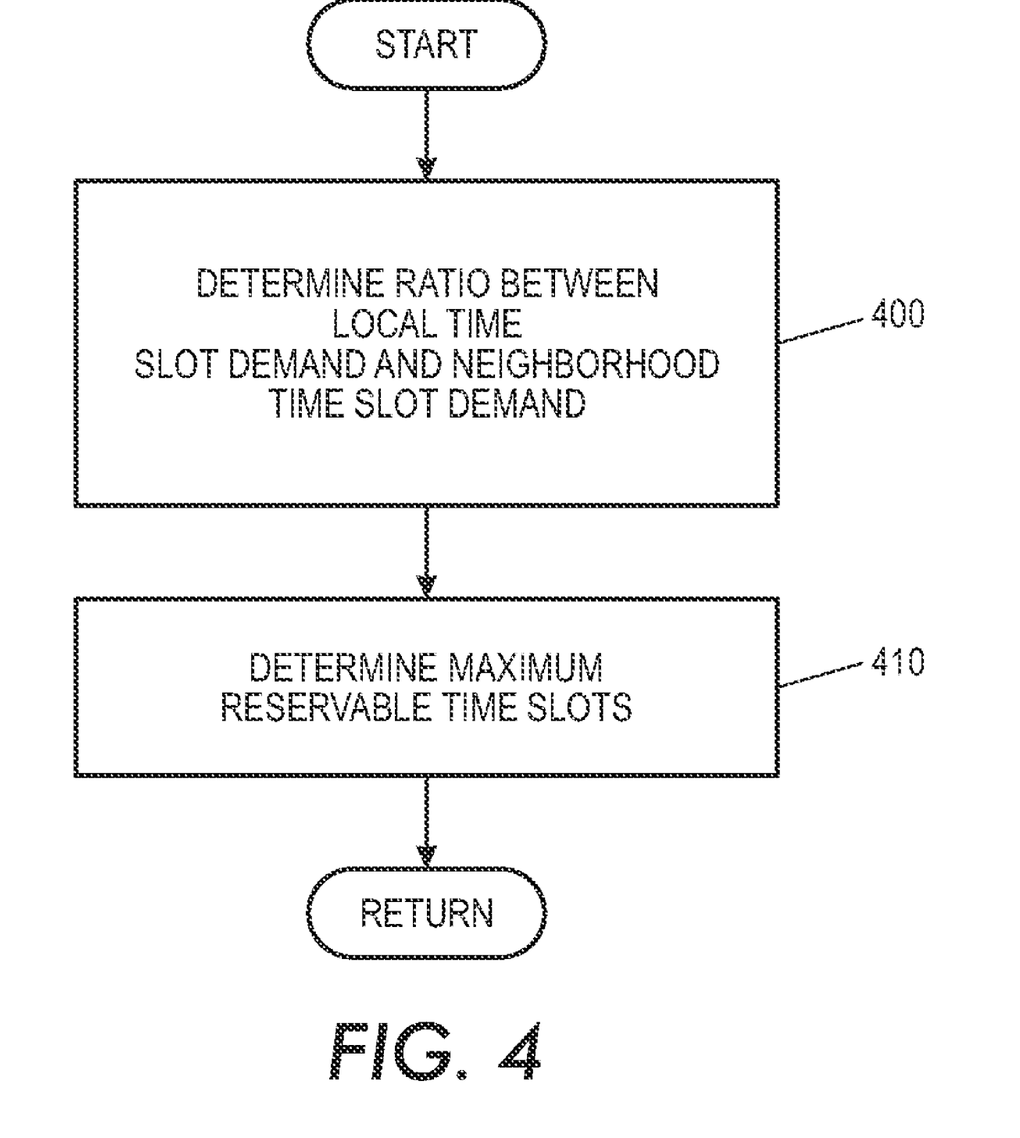
FIG. 4 presents a flowchart illustrating the process of determining a proportionally fair-share time slot assignment in accordance with an embodiment of the present invention.

If decision point t+1 is congested, then the proportionally fair-share time slot assignments for node i is This operation is summarized in operation 240 and detailed in FIG. 4. Specifically, the ratio shown above is determined in operation 400 and the maximum reservable time slots is determined in operation 410. In this example, the proportionally fair-time slot assignment is the product of the ratio and the $R_{max}$ (the maximum number of reservable time slots per frame). Various other methods can be used to determine the proportionally fair-share time slot assignment.

Any node with non-zero demand can receive at least one allowed time slot reservation, with each node receiving a number of reservable time slots in proportion to its demand in the contention area. The allowable reservations can exceed the available reservations, due to lag in the dynamic system. Reservations $$\Delta_i(t+1) = \begin{cases} \delta k_f & \text{if } \delta \geq 0 \\ \delta k_s & \text{if } \delta < 0 \text{ and } wb_i(t+1) \leq wb_i(t) \\ \delta k_{vs} & \text{otherwise} \end{cases}$$

are only available via time slot elections, so even if a node has available unfilled reservations, it may not be able to immediately fill them. The allowable change in reserved time slots is then Note that here $\delta = f_i(t+1) - \alpha_i(t)$. As before, the symbol $\delta$ is the differential, which is determined in operation 500 of FIG. 5. Also as before, a weighted sum of allowable reserved time slots for node i corresponding to one or more previous decision points can be used to determine the differential. Note also that $k_f$ is the fast growth rate (0.95 default), $k_s$ is the slow decay rate (0.25 default), and $k_{vs}$ is the very slow decay rate (0.125 default). Because these constants can all be different, the system can facilitate a fast increase and slow decrease rate controller. Note also that the allowable change in reserved time slots can not only be based not only on the differential and different growth or decay rates, but can be based also on a relationship between the weighted byte demand at the present decision point and the weighted byte demand at the immediately preceding decision point. This allows the system to have a faster decay rate when the differential is negative and the weighted byte demand is decreasing between the present decision point and the immediately preceding decision point.

$\Delta_i(t+1)$ is the change factor, which is determined in operation 510. As shown above, the change factor can be based on the differential, different growth or decay constants, and a relationship between the weighted byte demand at the present decision point and the weighted byte demand at the immediately previous decision point.

Note that in the congested case, the growth rate of time slots is dampened by $k_f$, which governs how responsive the system is to new load while preventing a node from overshooting the available time slots. If a node must release time slots ($\delta$<0), then it can release time slots at one of two rates. If the weighted byte demand at the node is not increasing, it will release time slots at the rate $k_s$. If the weighted byte demand at the node is increasing, it will release time slots at the slower rate $k_{vs}$. The total number of allowable reserved time slots for node i at the present decision point t+1 is denoted by $\alpha_i(t+1)$ and is determined by the following equation: $\alpha_i(t+1)=\alpha_i(t)+\Delta_i(t+1)$.

Operation 520 summarizes how $\alpha_i(t+1)$ is determined. Although the above equation shows that $\alpha_i(t+1)$ is determined based on the allowable change and the allowable reserved time slots corresponding to the immediately previous decision point, $\alpha_i(t+1)$ can be determined based on the allowable change and the allowable reserved time slots corresponding to one or more previous decision points. This enables the system to smooth its response over several previous decision points, not just the last one.

At decision point t+1, node i can add or release reservation time slots to bring its current allocation to the value $\alpha_i(t+1)$. In the case of adding reservation time slots, the additions can be done for newly elected time slots that are not otherwise reserved. This means that a node may not be able to add any new reservations, depending on the election results. In the case of reservation releases, the node can and must release its $\Delta_i(t+1)$ amount. The node is free to choose which of its current reservations to release using various methods. For example, the node can release reservations in a least-recently-used order. However, if one wishes to solve the optimization problem to find the minimum delay set given load arrival times, one could optimize the choice of time slot releases.

Reservation Protocol

Nodes can exchange information about which nodes hold which time slots in reserve in a timely fashion. This is done by propagating reservation addition and reservation release messages over the TDMA contention area. For multiple-hop contention areas, reservations can be forwarded by repeater nodes and flood the contention area. As a result, these updates are similar to link-state updates and the system can use a method such as multi-point relays or gossip suppression. For example, it is possible to use gossip suppression with an allowed gossip count of 3 (i.e., if a node has seen a particular update 3 or fewer times, it will still relay it).

Because there can be a large number of reservation updates, it is possible to use a compressed update format. A reservation addition (add) message can be the tuple {idx, time slot, age}, where idx is an 8-bit index into an array of node identifiers (IDs; 4-bytes each), each time slot is the 10-bit time slot number, modulo the frame size, and age is the 14-bit millisecond age of the update for a 32-bit message. A reservation release message can be the tuple {idx, time slot}, where idx is a 6-bit index to the node ID array and time slot is the 10-bit time slot number, for a 16-bit message. Because release messages have a smaller index than add messages, the node ID array can be filled in based on release messages first, and then add messages next. The node ID array contains the unique node IDs of every release and add message in the update.

When a node releases a time slot reservation for itself, it can generate a release update for that time slot. If a node releases multiple time slots at once, it can generate the messages all at once, or can space the messages out over the frame. The system can generate the messages all at once, as they will be sent incrementally based on available bandwidth. Likewise, when a node wins an electable time slot that is not otherwise reserved, the node can generate a reservation add update with 0 age. Because delete messages are transitory, it is not necessary to track their age. To enable reservation add updates to be tracked over time, each node can maintain a last sent time for each {nodeid, time slot} pair.

When it comes time to transmit reservation updates, delete messages can be transmitted first, up to 63 at a time, followed by reservation add messages. Once a delete message is sent, it can be erased. Reservation add messages can be tracked over time, and the last sent time is updated with each transmission. Reservation add messages can be stored in a priority heap sorted by the last sent time, so oldest messages are always sent first.

When a node receives a reservation update message, it first determines if the relevant node ID is in its contention area. If the node ID is not in the contention area, the update message is discarded. For a reservation release message, if the node does not know about the reservation, the message is discarded and not forwarded. Otherwise, the node erases the reservation and adds the release message to its transmit queue. For a reservation add message, if the age of the message is more recent than what the node currently knows, the node updates its age for the reservation. Whenever a node uses one of its reserved time slots, it indicates this in the header of the time slot. Each node receiving such a time slot header updates the age of the reservation to 0 and propagates the refreshed age according to the last sent priority queue.

Reservations can have a soft state timeout. If a reservation add message being tracked by a node is older than the soft state timeout, the message can be deleted. The timeout is determined by the approximate propagation time of a message over the contention area for a congested network. The timeout can be set to approximately 2.5 seconds when there are 400 time slots in 200 milliseconds with 300 reservable time slots per frame. Having a large soft state timeout is not problematic because time slots are normally released via release messages, not timeout. A received reservation is considered a "duplicate" for gossip count purposes if the received age is no newer than the currently known age.

Computer and Communication System

Figure 6:
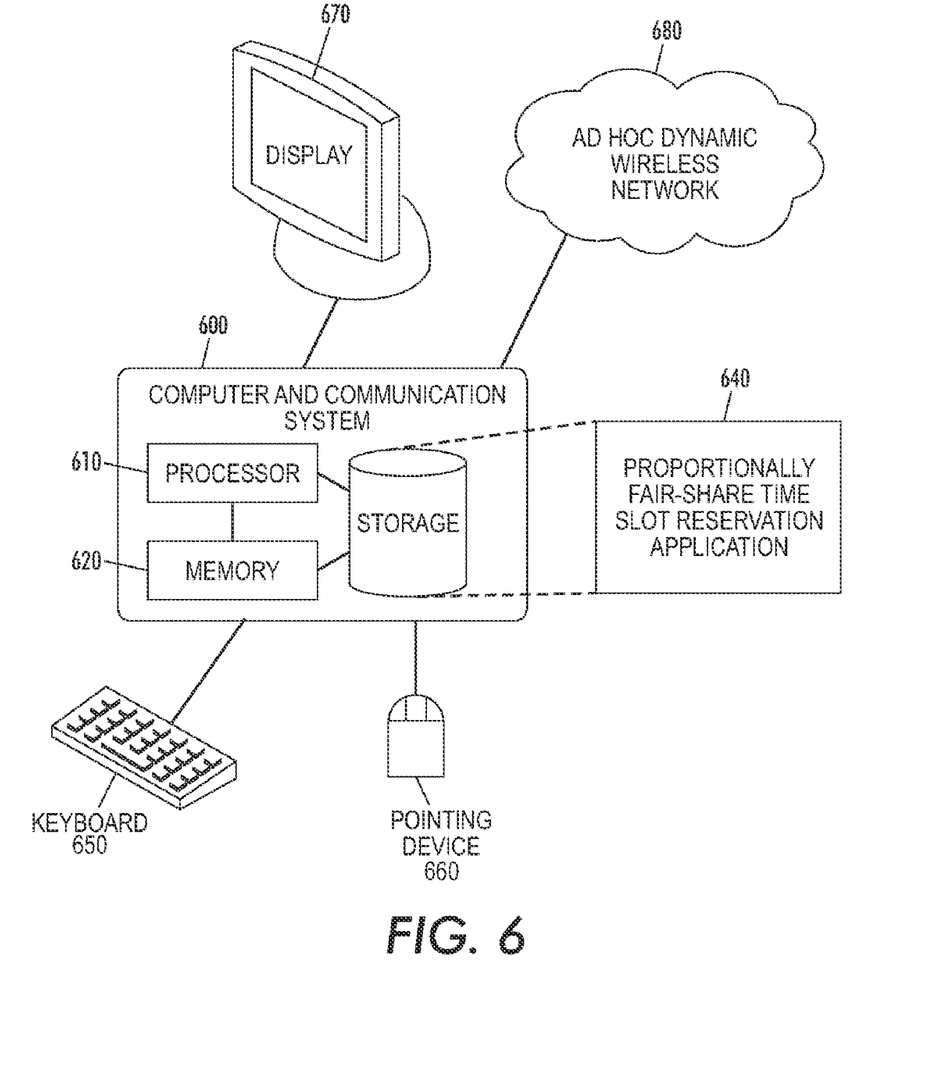
FIG. 6 presents an exemplary computer system for facilitating proportionally fair-share time slot reservations with a fast increase, slow decrease rate controller in an ad hoc dynamic wireless broadcast network in accordance with an embodiment of the present invention.

FIG. 6 presents an exemplary computer system for facilitating proportionally fair-share time slot reservations with a fast increase and slow decrease rate controller in accordance with an embodiment of the present invention. In FIG. 6, a computer and communication system 600 includes a processor 610, a memory 620, and a storage device 630, all of which are coupled together. Storage device 630 stores programs to be executed by processor 610. Specifically, storage device 630 stores a program 640 that implements a system (application) for facilitating proportionally fair-share time slot reservations with a fast increase and slow decrease rate controller.

Computer and communication system 600 is also coupled to an ad hoc dynamic wireless network 680, through which computer and communication system 600 (i.e., a node) can send, receive, and forward packets, and make proportionally fair-share time slot reservations with a fast increase, slow decrease rate controller. A coupling is typically wireless, ad hoc, and dynamic. That is, the neighbors of a node are determined by a transmitting range, and all nodes are mobile.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules (i.e., an apparatus or a mechanism configured for a specific purpose). For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for facilitating proportionally fair-share time slot reservations at a decision point at a node, comprising:
   determining local time slot demand, based on transmitted and queued data corresponding to one or more previous decision points;
   broadcasting the local time slot demand to one or more neighbors;
   determining neighbor time slot demands, wherein a respective neighbor time slot demand indicates a particular neighbor's local time slot demand corresponding to one or more previous decision points;
   determining neighborhood time slot demand, based on the local time slot demand and the neighbor time slot demands;
   determining a proportionally fair-share time slot assignment based on the neighborhood time slot demands, which involves determining a difference between a first time slot demand and a second time slot demand using a fast-increase and slow-decrease principle, wherein the second time slot is next to the first time slot;
   determining allowable reserved time slots, based on the local time slot demand and allowable reserved time slots corresponding to one or more previous decision points; and
   producing a result which indicates the allowable reserved time slots.

2. The method of claim 1, wherein determining local time slot demand further comprises:
   determining a weighted byte demand corresponding to a previous decision point, based on transmitted and queued data;
   determining an exponentially weighted moving average byte demand, based on the weighted byte demand and exponentially weighted moving average byte demands corresponding to one or more previous decision points; and
   determining broadcast bandwidth and a maximum reservable time slots per frame.

3. The method of claim 2, wherein determining the weighted byte demand comprises determining a weighted sum of one or more traffic priorities of the transmitted and queued data corresponding to a previous decision point.

4. The method of claim 1, wherein broadcasting the local time slot demand to one or more neighbors comprises encoding the local time slot demand into a load representing a fixed number of bits.

5. The method of claim 1, wherein determining neighbor time slot demands comprises determining that each respective neighbor is within a specific distance from the node, wherein the specific distance can be increased based on a timer.

6. The method of claim 1, wherein determining neighborhood time slot demand comprises determining a weighted sum of the local time slot demand and the neighbor time slot demands.

7. The method of claim 1, wherein determining the proportionally fair-share time slot assignment comprises:
   determining a ratio between the local time slot demand and the neighborhood time slot demand; and
   determining a maximum reservable time slots per frame.

8. The method of claim 1, wherein determining allowable reserved time slots comprises:
   determining a differential between the proportionally fair-share time slot assignment and a weighted sum of the allowable reserved time slots corresponding to one or more previous decision points;
   determining a change factor based on the differential;
   determining an allowable change based on the differential and the change factor; and
   determining allowable reserved time slots based on a weighted sum of the allowable change and the allowable reserved time slots corresponding to one or more previous decision points.

9. An apparatus for facilitating proportionally fair-share time slot reservations at a decision point at a node, comprising:
   a local-time slot-demand-determining mechanism configured to determine local time slot demand, based on transmitted and queued data corresponding to one or more previous decision points;
   a broadcasting mechanism configured to broadcast the local time slot demand to one or more neighbors;
   a neighbor-time-slot-demand-determining mechanism configured to determine neighbor time slot demands, wherein a respective neighbor time slot demand indicates a particular neighbor's local time slot demand corresponding to one or more previous decision points;
   a neighborhood-time slot-demand-determining mechanism configured to determine a neighborhood time slot demand based on the local time slot demand and the neighbor time slot demands;

a proportionally fair-share time slot-assignment-determining mechanism configured to determine a proportionally fair-share time slot assignment based on the neighborhood time slot demands, which involves determining a difference between a first time slot demand and a second time slot demand using a fast-increase and slow-decrease principle, wherein the second time slot is next to the first time slot;

an allowable-reserved-time slot-determining mechanism configured to determine allowable reserved time slots, based on the local time slot demand and allowable reserved time slots corresponding to one or more previous decision points; and a result-producing mechanism configured to produce a result which indicates the allowable reserved time slots.

10. The apparatus of claim 9, wherein the local-time slot demand-determining mechanism comprises:
- a weighted-byte-demand-determining mechanism configured to determine a weighted byte demand, based on transmitted and queued data corresponding to a previous decision point;
- an exponentially-weighted-moving-average-byte-demand-determining mechanism configured to determine an exponentially weighted moving average byte demand based on the weighted byte demand and exponentially weighted moving averages corresponding to one or more previous decision points; and
- a bandwidth-and-reservation-determining mechanism configured to determine broadcast bandwidth and a maximum reservable time slots per frame.

11. The apparatus of claim 10, wherein while determining the weighted-byte demand, the weighted-byte-demand-determining mechanism comprises a weighted-sum-determining mechanism configured to determine a weighted sum of one or more traffic priorities of the transmitted and queued data corresponding to a previous decision point.

12. The apparatus of claim 9, wherein while broadcasting the local time slot demand, the broadcasting mechanism comprises an encoding mechanism configured to encode the local time slot demand into a load representing a fixed number of bits.

13. The apparatus of claim 9, wherein while determining the neighbor time slot demand, the neighbor-time-slot-demand-determination mechanism comprises a distance-determining mechanism configured to determine that each respective neighbor is within a specific distance from the node, wherein the specific distance can be increased based on a timer.

14. The apparatus of claim 9, wherein while determining the neighborhood time slot demand, the neighborhood-time-slot-demand determining mechanism comprises a weighted-sum determination mechanism configured to determine a weighted sum of the local time slot demand and the neighbor time slot demands.

15. The apparatus of claim 9, while determining the proportionally fair-share time slot assignment, the proportionally fair-share time-slot-assignment-determining mechanism comprises:
- a ratio-determining mechanism configured to determine a ratio between the local time slot demand and the neighborhood time slot demand; and
- a maximum-reservable-time-slot determining mechanism configured to determine a maximum reservable time slots per frame.

16. The apparatus of claim 9, wherein while determining the allowable reserved time slots, the allowable-reserved-time-slots-determining mechanism comprises:

a differential-determining mechanism configured to determine a differential between the proportionally fair-share time slot assignment and a weighted sum of the allowable reserved time slots corresponding to one or more previous decision points;

a change-factor-determining mechanism configured to determine a change factor based on the differential;

an allowable-change-determining mechanism configured to determine an allowable change based on the differential and the change factor; and an allowable-reserved-time-slot determining mechanism configured to determine allowable reserved time slots based on a weighted sum of the allowable change and the allowable reserved time slots corresponding to one or more previous decision points.

17. A non-transitory computer-readable storage device storing instructions that when executed by a computer cause the computer to perform a method for facilitating proportionally fair-share time slot reservations at a decision point at a node, the method comprising:

determining local time slot demand, based on transmitted and queued data corresponding to one or more previous decision points;

broadcasting the local time slot demand to one or more neighbors;

determining neighbor time slot demands, wherein a respective neighbor time slot demand indicates a particular neighbor's local time slot demand corresponding to one or more previous decision points;

determining neighborhood time slot demand based on the local time slot demand and the neighbor time slot demands;

determining a proportionally fair-share time slot assignment based on the neighborhood time slot demands, which involves determining a difference between a first time slot demand and a second time slot demand using a fast-increase and slow-decrease principle, wherein the second time slot is next to the first time slot;

determining allowable reserved time slots, based on the local time slot demand and allowable reserved time slots corresponding to one or more previous decision points; and producing a result which indicates the allowable reserved time slots.

18. The storage device of claim 17, wherein determining local time slot demand further comprises:

determining a weighted byte demand, based on transmitted and queued data corresponding to a previous decision point;

determining an exponentially weighted moving average byte demand, based on the weighted byte demand and exponentially weighted moving average byte demands corresponding to one or more previous decision points; and determining broadcast bandwidth and a maximum reservable time slots per frame.

19. The storage device of claim 18, wherein determining a weighted byte demand comprises determining a weighted sum of one or more traffic priorities of the transmitted and queued data corresponding to a previous decision point.

20. The storage device of claim 17, wherein broadcasting the local time slot demand to one or more neighbors comprises encoding the local time slot demand into a load representing a fixed number of bits.

21. The storage device of claim 17, wherein determining neighbor time slot demands comprises determining that each respective neighbor is within a specific distance from the node, wherein the specific distance can be increased based on a timer.

22. The storage device of claim 17, wherein determining neighborhood time slot demand comprises determining a weighted sum of the local time slot demand and the neighbor time slot demands.

23. The storage device of claim 17, wherein determining the proportionally fair-share time slot assignment comprises:
   determining a ratio between the local time slot demand and the neighborhood time slot demand; and
   determining a maximum reservable time slots per frame.

24. The storage device of claim 17 wherein determining allowable reserved time slots comprises:

determining a differential between the proportionally fair-share time slot assignment and a weighted sum of the allowable reserved time slots corresponding to one or more previous decision points;

determining a change factor based on the differential;

determining an allowable change based on the differential and the change factor; and determining allowable reserved time slots based on a weighted sum of the allowable change and the allowable reserved time slots corresponding to one or more previous decision points.

* * * * *